United States Patent [19]

Harrison et al.

[11] Patent Number: 5,440,339
[45] Date of Patent: Aug. 8, 1995

[54] SYSTEM AND METHOD FOR TESTING INTENSITY RESPONSE OF A MEDICAL MONOCHROME VIDEO MONITOR

[75] Inventors: John R. Harrison; George B. Stanescu, both of Scarborough, Canada

[73] Assignee: U.S. Philips Corporation, New York, N.Y.

[21] Appl. No.: 227,212

[22] Filed: Apr. 13, 1994

[51] Int. Cl.$^6$ ............................................. H04N 17/02
[52] U.S. Cl. .................................. 348/189; 348/177; 348/180; 348/181; 348/184
[58] Field of Search ............... 348/177, 178, 180, 181, 348/182, 189, 190, 191, 194, 184, 185; H04N 17/02; 345/155, 132, 148, 149, 147, 153, 904

[56] References Cited

U.S. PATENT DOCUMENTS

| | | | |
|---|---|---|---|
| 4,910,681 | 3/1990 | Ohtake et al. | 348/181 |
| 4,974,080 | 11/1990 | Fritchie et al. | 348/181 |
| 5,343,242 | 8/1994 | Rowsell et al. | 348/189 |
| 5,345,263 | 9/1994 | Miller | 348/191 |

OTHER PUBLICATIONS

AverKey Pocket Size VGA to Video User's Manual, Issue No. 1 Nov. 15, 1992.

Primary Examiner—James J. Groody
Assistant Examiner—Nina N. West
Attorney, Agent, or Firm—Jack D. Slobod

[57] ABSTRACT

The intensity output of a monochrome interlaced video monitor typically used in medical imaging may be tested as follows. The video card of a computer is controlled to output equal video intensity levels of red, green, and blue for a time sequenced series of different levels. These video signals are combined and attenuated such that the peak level of the series is about 700 mV, which is the industry standard for peak white on a monochrome monitor. The sync pulses from the video card are adjusted to about −300 mV, which is the industry standard for sync pulses driving a monochrome video monitor and are combined with the combined video signal to produce an intensity test signal for driving the monitor. The video card is controlled to produce a high line rate to drive video monitors having an (approximately double) high line rate and to produce a low line rate to drive video monitors having (an approximately double) low line rate.

12 Claims, 3 Drawing Sheets

SYSTEM AND METHOD FOR TESTING INTENSITY RESPONSE OF A MEDICAL MONOCHROME VIDEO MONITOR

BACKGROUND OF THE INVENTION

1. Field of the Invention

This invention relates to a system and method for producing an intensity test signal for a medical monochrome video monitor.

2. Description of the Related Art

High performance monochrome video monitors are typically used in the field of medical diagnostic video imaging. This use requires a high quality video output from the monitor. However, the video quality of a monitor does degrade with time. Therefore, it is important for the calibre of the monitor output to be checked regularly. Medical monitors are typically tested by trained technicians with the aid of devices which cause the monitors to display test patterns for the technician to view for defocussing and distortions. Generally the technicians also visually check the intensity of the monitor's output in response to these test patterns. Visual intensity testing is, however, only an approximate measure of the intensity response of the monitor, not only because of its subjective element from technician to technician, but also because of the impact of variable ambient light conditions. Further, medical monochrome monitors generally operate with one of two line rates: 525 lines per screen or 1049 lines per screen. This requires different test equipment for monitors with different line rates.

When a medical monitor is in use, an operator who is not satisfied with a particular image may adjust the brightness and contrast controls of the monitor in an attempt to improve the image clarity. However, this could wash out grey-scale gradations in the image thereby obscuring potentially important image features. Further, these reset controls will impact on future use of the monitor and, when such a reset monitor comes up for testing, it is not certain that the technician will properly return the brightness and contrast controls to their optimal settings.

This invention seeks to overcome drawbacks of the known prior art.

SUMMARY OF THE INVENTION

According to this invention, there is provided a system for producing an intensity test signal for a medical interlaced monochrome video monitor, comprising: means for controlling a computer video card of the type having red, green, and blue video outputs and horizontal and vertical sync outputs and generating video and sync signals at a line rate substantially half the line rate of monochrome video monitors for which said system is designed for use, to output a video signal on one or more of said red, green and blue video outputs at a defined video intensity level, for a time sequenced series of different video intensity levels; means for connection to the one or more of said red, green, and blue video outputs of said video card on which said control means outputs a video signal for producing a single grey scale video signal; means for receiving the sync signals of said video card and for adjusting the voltage level of said sync signals to about negative 300 mV; means for mixing said sync signals with said grey-scale video signal to produce an interlaced monochrome video monitor test signal.

In another aspect of this invention, there is provided a method for testing the intensity output of a medical interlaced monochrome video monitor, comprising the steps of: controlling a computer video card, of the type having red, green, and blue video outputs, horizontal and vertical sync outputs and a line rate substantially half the line rate of said monochrome video monitor, to output a video signal on one or more of said red, green and blue video outputs, having a defined video intensity level, for a time sequenced series of different levels; producing a single grey-scale video signal from the one or more of said red, green, and blue video outputs of said video card on which a video signal has been output; receiving the sync signals of said video card and adjusting the voltage level of said sync signals to about negative 300 mV; mixing said sync signals with said grey-scale signal to produce a monochrome video monitor intensity test signal and driving a monochrome monitor with said test signal; sensing the intensity of light emitted by said monochrome monitor for each signal level of said monochrome monitor test signal; and comparing the sensed intensities with a pre-determined intensity response in order to test the intensity response of said monochrome monitor.

DETAILED DESCRIPTION OF THE PREFERRED EMBODIMENTS

Figure 1:
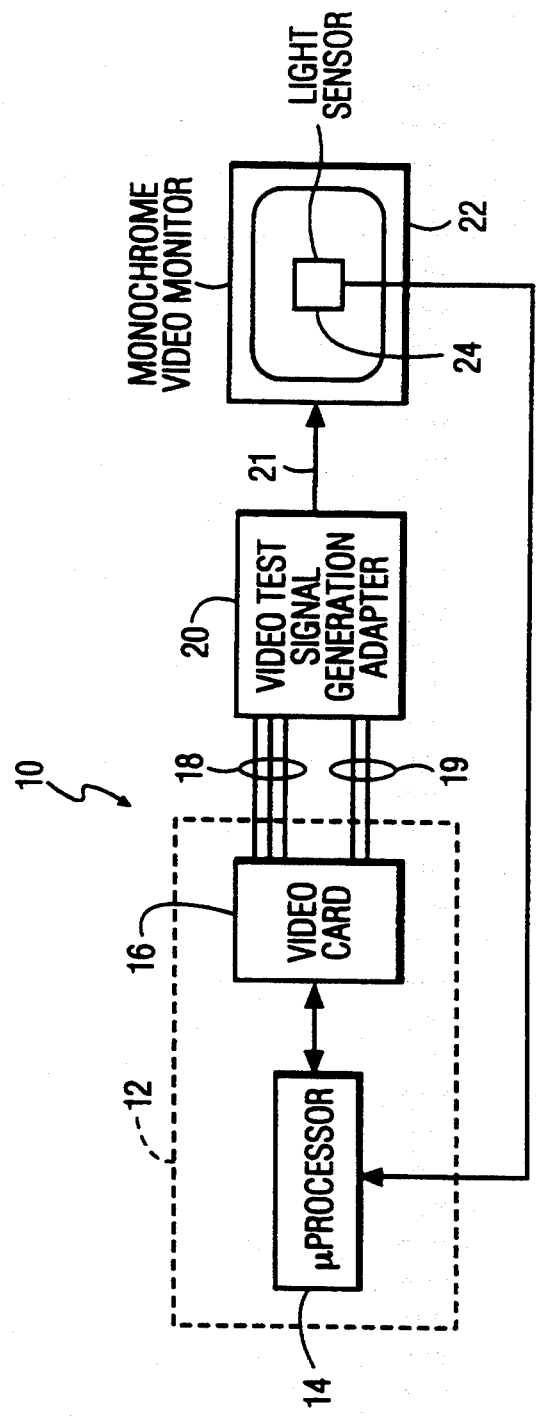
FIG. 1 is a schematic view of a system for producing a test signal for a monochrome video monitor.

With reference to FIG. 1, a system 10 for producing an intensity test signal for a monochrome video monitor comprises a portable computer 12, with a microprocessor 14 connected for two-way communication with a video card 16. The video card is of the type having red, green, and blue video outputs on lines 18 and horizontal and vertical sync outputs on lines 19. The video card may be a VGA card which, as is explained hereinafter, can be controlled to generate a low line rate of about 240 lines per screen, as well as the normal VGA (high) line rate of about 480 lines per screen. With a VGA card, each video colour output line can be set to one of sixteen intensity levels which allows the card to generate a variety of colours. The output of the video card is connected to video test signal generation adapter 20. The output of the adapter appears on line 21 and inputs a monochrome video monitor 22. A light sensor 24 is positioned to receive light from the centre of the monitor screen. The output of the light sensor feeds back to the microprocessor 14.

Figure 2:
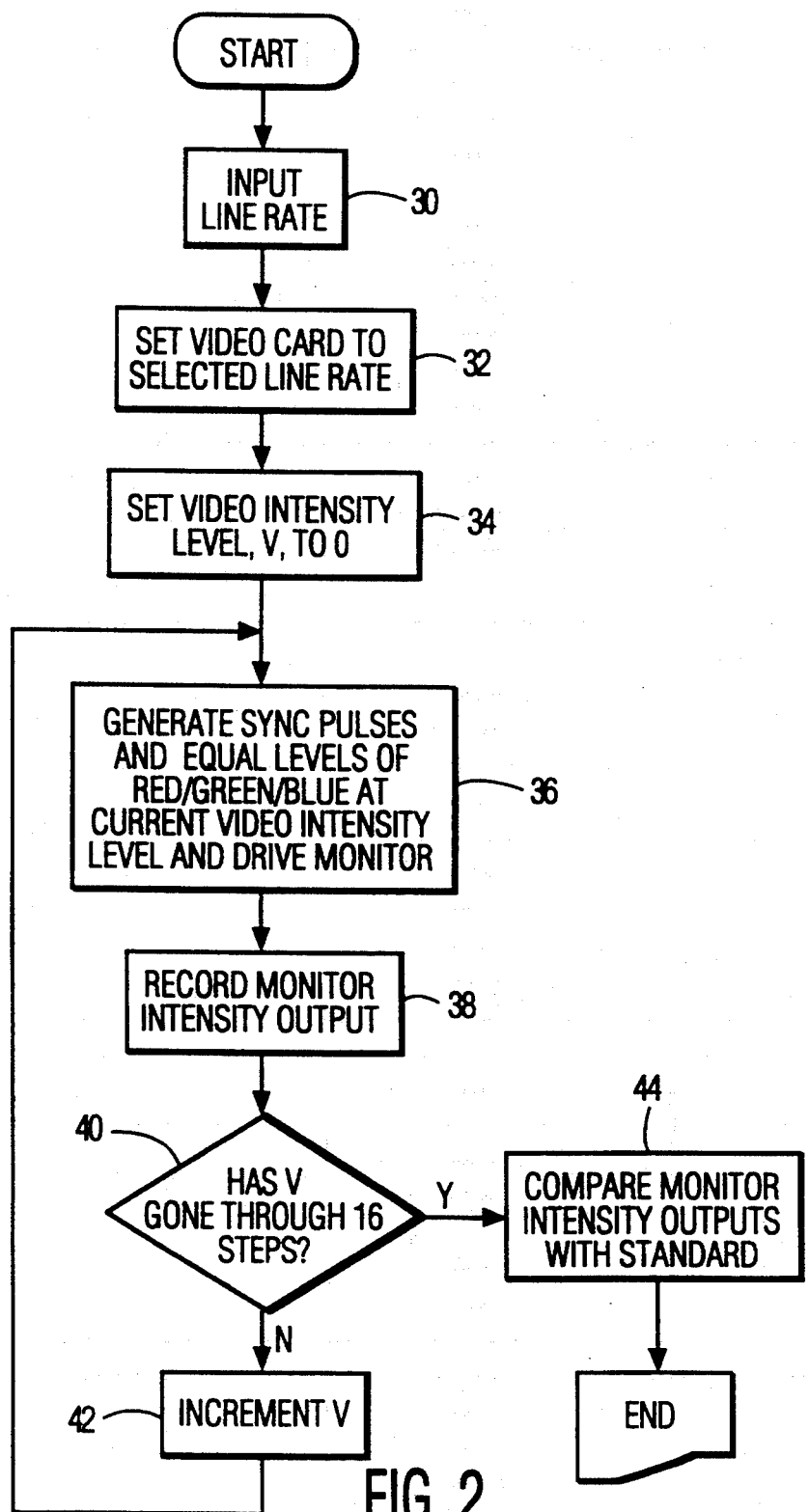
FIG. 2 is a flow diagram of the software control for the system of FIG. 1.

With reference to FIG. 2 in conjunction with FIG. 1, in overview, the system 10 operates as follows. Computer 12 has a resident software utility which can switch a VGA video card between CGA-type line rate of 240 lines per screen and the normal VGA line rate of 480 lines per screen. A software utility providing this operation is sold by Yuan Technology, Inc. of Taiwan under the trade mark DEMOKEY. An operator inputs the microprocessor 14 with the line rate of the particular video monitor 22 under test (block 30). This video line rate may either be a 525 lines per screen (low) rate or a 1049 lines per screen (high) rate. If the video line rate is 1049, then the video card is switched to its high line rate of 480 lines per screen and, conversely, if the video line rate is 525, the video card is switched to its low line rate of 240 lines per screen (block 32).

For reasons detailed hereinafter, it has been found that a 480 line per screen line rate is sufficient to drive a 1049 lines per screen interlaced video monitor without the monitor locking up and, similarly, that a 240 lines per screen rate will drive a 525 lines per screen interlaced video monitor.

After a line rate is input to the computer 12, the microprocessor zeros a video intensity level indicator (block 34). The processor next controls the video card to output equal signal levels on the red, green and blue video signal lines 18, at the current video intensity level (block 36). Throughout, the video card will generate sync pulses on lines 19 at the line rate (high or low) which has been chosen for the card.

The colour signal output lines are combined in adapter 20. Further, in adapter 20, the sync pulses on lines 19 are adjusted to the level of about −300 mV, which is the standard for sync pulses driving a video monitor. The adjusted sync pulses are then mixed with the mixed video signal to generate a monochrome video monitor test signal on line 21 which drives monitor 22 (block 36).

The light sensor 24 picks up the intensity output from the monitor 22 and feeds this back to the processor 14. The processor records this feedback signal (block 38). The video intensity level of zero is set to correspond to a very small output for a black level video signal, rather than a zero output, so that a non-zero reference signal will be expected from the light meter.

Next the video intensity level indicator is incremented (block 42) and the video card is controlled to output equal signal levels on the red, green and blue signal lines 18 at the new (larger) video intensity level (block 36). The new output intensity signal is then recorded. This cycle is repeated until all sixteen grey-scale steps have been recorded.

In this way, the video monitor intensity test signal generates a time sequenced grey-scale on monitor 22, beginning with black and progressing through ever lighter greys. Adapter 20 adjusts the level of the combined video signal so that the last (sixteenth) level produced by the video card results in an approximately 700 mV video signal, which is the industry standard for peak white for a monochrome video monitor.

The intensity output by the monochrome monitor is recorded by the microprocessor for each level in the grey-scale. After the video intensity level has stepped through sixteen gradations, the test is complete. The processor then compares the recorded intensity output levels of the monitor with a standard stored in the processor in order to derive an indication of whether the monitor is functioning within pre-determined limits (block 44). If the monitor fails to produce satisfactory results and adjustment of brightness and contrast controls do not solve the problem, it is indicative that the monitor has degraded to the point where it should be replaced.

A given computer will generate highly consistent video card voltage output levels. Because of this, the test signal produced by the system of this invention can consistently produce close to the video standard negative 300 mV for sync pulses and a grey-scale with a peak white voltage value of about the video standard 700 mV. Consequently, the test signal permits an accurate test for a monochrome video monitor and is therefore adapted for testing monochrome video monitors used for medical imaging.

The image formed by a medical imaging system invariably covers the centre of the video monitor screen such that the centre of the screen sustains the heaviest use and is the first to degrade. Recognising this, the video content of the test signal is arranged to illuminate only the centre of the monitor screen; the light sensor 24 (FIG. 1) is positioned to receive only the output from the centre of the screen. Outside the screen centre, the video intensity level is set to black (zero level).

The reason the video card line rates of 240 or 480 lines per screen drive a video monitor having 525 or 1049 lines per screen, respectively, is due to the following. Monochrome video monitors utilise interlaced scanning. Consequently, with a normal video signal, for each frame of the picture, two fields are scanned by the monitor. All odd lines of the frame are first traced on the screen and then all even lines are traced. Therefore, on any one scan, only one-half of the screen lines are scanned. Because the line rate produced by the video card is substantially one-half of the line rate of the video monitor, one frame of the picture generated by the video card is produced in each field scanned. Thus one-half of the screen lines are not used in producing a frame.

Even with interlaced operation, the video card does not produce quite as many lines per frame as are scanned per field. However, this does not affect the operation of this invention because the unscanned lines are at the periphery of the monitor screen.

While a monitor responding to an analog video signal will have an infinite number of grey-scale levels, it has been found that measuring intensity response with a sixteen level grey-scale is a satifactory determiner of the performance of a video monitor utilised for medical imaging.

Figure 3:
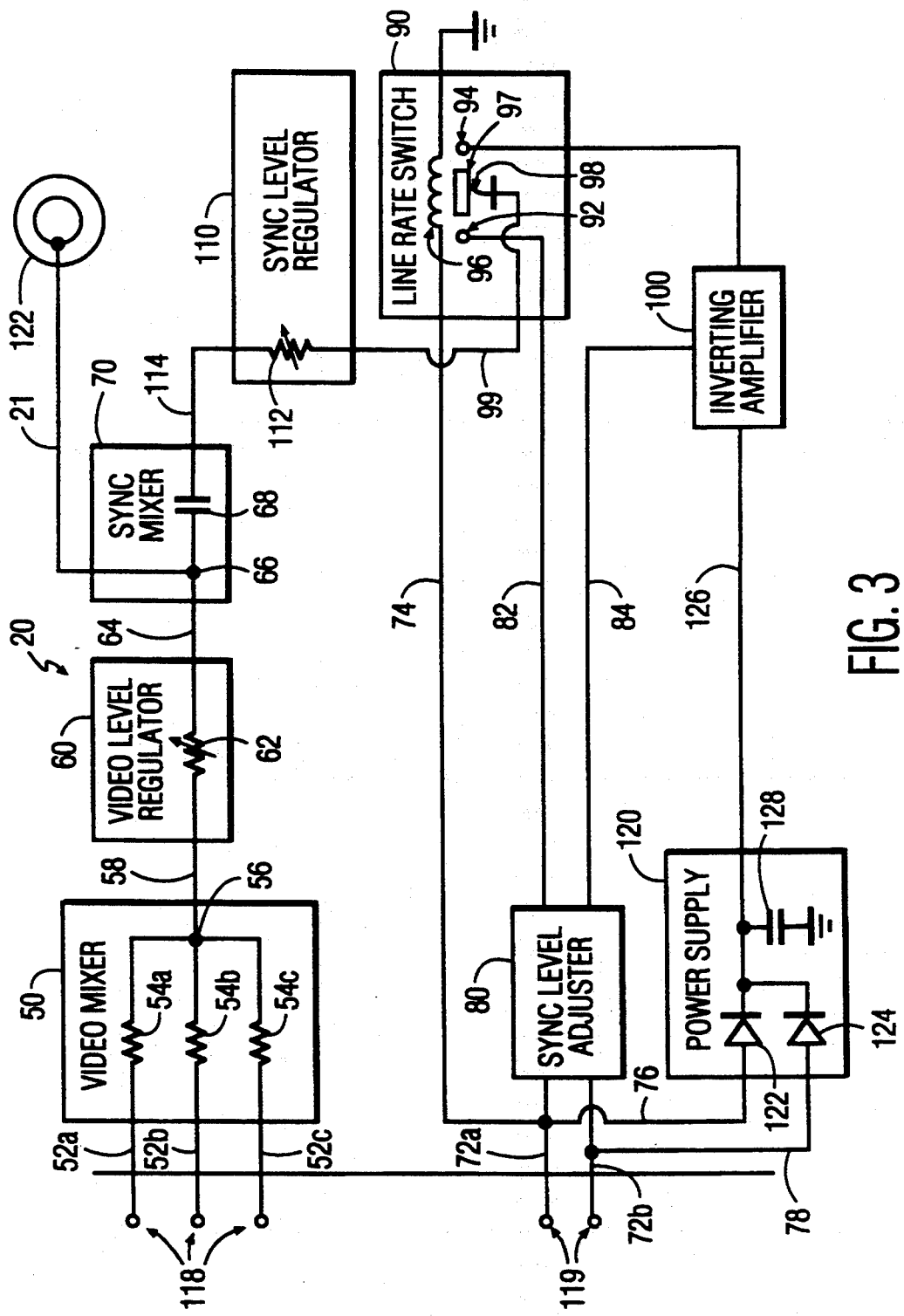
FIG. 3 is a schematic view detailing a portion of FIG. 1.

FIG. 3 details the implementation of the video test signal generation adapter 20. Turning to FIG. 3, adapter 20 has three inputs 118, one for connection to each of the video output lines of a video card. Lines 52a, 52b, 52c extend from the inputs 118 to video mixer 50. The video mixer incorporates a resistor 54a, 54b, 54c in lines 52a, 52b, 52c, respectively. The lines 52a, 52b, 52c are combined at node 56. Line 58 from the node terminates in potentiometer 62 of video level regulator 60. Line 64 from the potentiometer extends through node 66 of sync mixer 70 to the capacitor 68 of the sync mixer. Output line 21 extends from node 66 of the sync mixer 70 to RCA plug 122. This plug is designed for connection to a seventy-five ohm monochrome video monitor.

The adapter 20 also has two inputs 119 for connection to the horizontal and vertical sync outputs of a video card. Line 72a is intended to be input with the horizontal sync pulses of the video card and line 72b with the vertical sync pulses of the card. Both lines enter sync level adjuster 80 wherein they are combined and the sync pulses attenuated with appropriate resistors. The output lines 82 and 84 from the sync level adjuster carry both horizontal and vertical attenuated sync pulses. Line 82 is connected to terminal 92 of line rate switch 90 and line 84 is connected through inverting amplifier 100 to a terminal 94 of line rate switch 90. The line rate switch 90 has a coil 96 which is connected between branch 74 of line 72a and ground. A shuttle 97 is free to move between switch terminals 92 and 94. A wiper 98 connects the shuttle to line 99 which extends to potentiometer 112 of sync level regulator 110. Line 114 extends between the other side of the potentiometer and capacitor 68 of sync mixer 70.

A branch 76 from line 72a extends to diode 122 of power supply 120 and a branch 78 from line 72b extends to diode 124 of the power supply. The output from the diodes merge into line 126 which has a capacitor 128 extending between the line and ground. Line 126 extends to the power input of the inverting amplifier 100.

The operation of the adapter 20 of FIG. 3 after connection to a computer 12 (FIG. 1) is as follows. Red, green and blue video signals received from the video card of the computer at inputs 118 are attenuated by resistors 54a, 54b, and 54c and combined at node 56 of video mixer 50. The combined signal is further attenuated by potentiometer 62 of the video level regulator 60. The setting of the potentiometer 62 is dependent on the computer make with which the adapter is used. Different computers makes have differing, but known and relatively predictable, video output voltage levels. Potentiometer 62 is switchable (manually or through software) to discrete settings which match the particular computer to which the adapter is connected so that the voltage level of the grey scale video output of the adapter is standardized such that the peak white value of the scale is about 700 mV. The switchable settings may be determined in the lab for a particular computer type.

The standardized grey-scale signal appears on line 64. Recall from FIG. 2 that the grey-scale level is incremented during monitor testing.

The horizontal and vertical sync pulses from the computer are received by lines 72a, 72b. As will be appreciated by those skilled in the art, these VGA video card generated pulses are on the order of five volts in magnitude. These pulses are therefore attenuated in the sync level adjuster 80 and the attenuated signals are placed on both lines 82 and 84.

The horizontal sync pulses are coupled to coil 96 of switch 90 via line 74. If these pulses are negative going VGA pulses, then these pulses draw shuttle 97 into contact with terminal 92. If these pulses are positive going CGA-type pulses, they draw the shuttle into contact with terminal 94.

If the pulses are negative going VGA pulses, then these pulses, in their attenuated form on line 82, are coupled through switch 90 to line 99. If the pulses are positive going CGA-type pulses, then these pulses, in their attenuated form on line 84, are coupled through inverting amplifier and switch 90 to line 99. The inverting amplifier converts the CGA-type pulses to negative going pulses and matches their level to the attenuated VGA pulses. The power for the inverting amplifier is provided by power supply 120 which taps lines 72a, 72b through diodes 122, 124. The power supply is smoothed by capacitor 128.

Like potentiometer 62, potentiometer 112 of the sync level regulator is switchable to discrete settings based upon the particular make of computer connected to the adapter. This ensures that the negative going sync pulses on line 99 have a magnitude of about −300 mV on line 114. These sync pulses on line 114 are mixed with the video signal on line 64 (through capacitor 68) at node 66, and the mixed output signal appears on line 21.

It will be appreciated by those skilled in the art that a computer VGA video card alternately outputs a video signal on its three colour lines and then a horizontal sync pulse. Consequently, the output on line 21 will comprise, repetitively, a horizontal sync pulse and then a video signal on a single line, which is the format for a video signal. After outputing 480 horizontal sync pulses for the high line VGA rate (or 240 pulses when run in low line rate), a vertical sync pulse is generated which returns the electron beam for the monochrome video monitor back to its starting position.

The light sensor 24 (FIG. 1) is surrounded by a blind to shield out ambient light.

As will be appreciated by those skilled in the art, the system of this invention could be adapted to generate a monochrome video monitor intensity test signal utilising certain other types of video cards, such as a super VGA card. Further, the system of this invention could utilise only one or two of the three colour output lines from the video card and still have sufficient power levels to produce a multi-level grey scale on a monochrome video monitor.

Rather than feeding back each output signal of light meter 24 (FIG. 1) to the microprocessor, an operator could record each output. The operator could then compare the compiled outputs with a standard in order to determine the performance of the monitor. With this modification, the operator would prompt the microprocessor when to step through each increment of the grey-scale.

Other modifications will be apparent to those skilled in the art and, therefore, the invention is defined in the claims.

What is claimed is:

1. A system for producing an intensity test signal for a medical interlaced monochrome video monitor, comprising:
   - means for controlling a computer video card of the type having red, green, and blue video outputs and horizontal and vertical sync outputs and generating video and sync signals at a line rate substantially half the line rate of monochrome video monitors for which said system is designed for use, to output a video signal on one or more of said red, green and blue video outputs at a defined video intensity level, for a time sequenced series of different video intensity levels;
   - means for connection to the one or more of said red, green, and blue video outputs of said video card on which said control means outputs a video signal for producing a single grey-scale video signal;
   - means for receiving the sync signals of said video card and for adjusting the voltage level of said sync signals to about negative 300 mV;
   - means for mixing said sync signals with said grey-scale video signal to produce an interlaced monochrome video monitor test signal.

2. The system of claim 1 wherein said video card is of the type which may generate a low line rate or a high line rate, said low line rate being substantially half the low line rate of a first type of monitor with which said system is designed for use and said high line rate being substantially half the high line rate of a second type of monitor with which said system is designed for use, and wherein said system includes means to selectively control said video card to produce a low line rate or a high line rate.

3. The system of claim 1 wherein said video card is of the type which may be controlled to produce a high line rate having negative sync pulses or a low line rate having positive sync pulses, said low line rate being substantially half the low line rate of a first type of monitor with which said system is designed for use and said high line rate being substantially half the high line rate of a second type of monitor with which said system is designed for use, said system including means to control said video card to selectively produce high line rate or low line rate signals; and wherein said means to adjust the voltage of said sync pulses to about negative 300 mV includes means to invert said low line rate sync signals.

4. The system of claim 1 wherein said video card is of the type which may be controlled to produce VGA signals or CGA-type signals, the line rate of said CGA-type signals being about 240 lines per screen, said CGA-type signals being for control of a 525 lines per scrren monitor with which said system is designed for use and the line rate of said VGA signals being about 480 lines per screen, said VGA signals being for control of a 1049 lines per screen monitor with which said system is designed for use, said system including means to control said video card to selectively produce VGA signals or CGA-type signals; and wherein said means to adjust the voltage of said sync pulses to about negative 300 mV includes means to invert said CGA-type signals.

5. The system of claim 1 including light sensing means for sensing the intensity of light output by a monochrome video monitor input with said intensity test signal.

6. The system of claim 5 including means to compare the intensity output of a monochrome video monitor input with said intensity test signal with a standard and for indicating whether said monitor meets or does not meet said standard.

7. The system of claim 2 including light sensing means for sensing the intensity of light output by a monochrome video monitor input with said intensity test signal.

8. The system of claim 7 wherein means to compare the intensity output of a monochrome video monitor input with said intensity test signal with a standard and for indicating whether said monitor meets or does not meet said standard.

9. A method for testing the intensity output of a medical interlaced monochrome video monitor, comprising the steps of:
- controlling a computer video card, of the type having red, green, and blue video outputs, horizontal and vertical sync outputs and a line rate substantially half the line rate of said monochrome video monitor, to output a video signal on one or more of said red, green and blue video outputs, having a defined video intensity level, for a time sequenced series of different levels;
- producing a single grey-scale video signal from the one or more of said red, green, and blue video outputs of said video card on which a video signal has been output;
- receiving the sync signals of said video card and adjusting the voltage level of said sync signals to about negative 300 mV;
- mixing said sync signals with said grey-scale signal to produce a monochrome video monitor intensity test signal and driving a monochrome monitor with said test signal;
- sensing the intensity of light emitted by said monochrome monitor for each signal level of said monochrome monitor test signal; and
- comparing the sensed intensities with a pre-determined intensity response in order to test the intensity response of said monochrome monitor.

10. The method of claim 9 wherein said step of controlling a computer video card comprises controlling the card such that said monochrome monitor test signal drives said monitor to illuminate the central area of said monitor and wherein said step of sensing the intensity of light emitted by said monitor comprises sensing emissions with a light sensor at the centre of said monitor.

11. A method for producing a medical monochrome interlaced video monitor test signal, comprising the steps of:
- controlling a computer video card, of the type having red, green, and blue video outputs, horizontal and vertical sync outputs, a first line rate substantially half the line rate of a first type of monochrome video monitor, and a second line rate substantially half the line rate of a second type of monochrome video monitor, to simultaneously output equal levels of red, green and blue video signals for a time sequenced series of different levels at a selected line rate;
- mixing said video output signals to produce a grey-scale signal;
- receiving the sync signals of said video card at said selected line rate and adjusting the voltage level of said sync signals to about negative 300 mV; and
- mixing said sync signals with said grey-scale signal to produce a monochrome video monitor test signal and driving a monochrome monitor with said test signal.

12. The method of claim 11 including the steps of:
- sensing the intensity of light emitted by said monochrome monitor for each signal level of said monochrome monitor test signal; and
- comparing each said sensed intensity with a predetermined intensity response in order to test the response of said monochrome monitor.

* * * * *